United States Patent
Gu et al.

(10) Patent No.: US 11,956,321 B2
(45) Date of Patent: *Apr. 9, 2024

(54) INFORMATION PROCESSING METHOD, DEVICE AND STORAGE MEDIUM FOR INPUTTING A SCREEN TRANSMISSION CODE

(71) Applicants: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

(72) Inventors: Jincheng Gu, Guangzhou (CN); Sheng Huang, Guangzhou (CN)

(73) Assignees: GUANGZHOU SHIYUAN ELECTRONIC TECHNOLOGY COMPANY LIMITED, Guangzhou (CN); GUANGZHOU SHIRUI ELECTRONICS CO., LTD., Guangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,529

(22) Filed: Aug. 30, 2022

(65) Prior Publication Data
US 2023/0007087 A1 Jan. 5, 2023

Related U.S. Application Data

(63) Continuation of application No. PCT/CN2021/075986, filed on Feb. 8, 2021.

(30) Foreign Application Priority Data

Dec. 4, 2020 (CN) .......................... 202011399017.0

(51) Int. Cl.
*H04L 67/141* (2022.01)
*H04L 9/40* (2022.01)
*H04L 67/1095* (2022.01)

(52) U.S. Cl.
CPC ........ *H04L 67/141* (2013.01); *H04L 63/0838* (2013.01); *H04L 67/1095* (2013.01)

(58) Field of Classification Search
CPC ... H04L 67/141; H04L 67/1095; H04L 47/70; H04L 63/08; H04L 63/0838; H04L 9/32;
(Continued)

(56) References Cited

U.S. PATENT DOCUMENTS 8,610,730 B1 * 12/2013 Li .................. H04N 21/432
345/520
10,209,944 B2 * 2/2019 Shan ..................... H04W 68/02
(Continued)

FOREIGN PATENT DOCUMENTS

CN 102385577 A 3/2012
CN 102983890 A 3/2013
(Continued)

OTHER PUBLICATIONS

International Search Report issued in corresponding international application No. PCT/CN2021/075986, dated Aug. 30, 2021.
(Continued)

*Primary Examiner* — James N Fiorillo
(74) *Attorney, Agent, or Firm* — BAYES PLLC

(57) ABSTRACT

An information processing method, device, and storage medium are provided. The method includes: a screen-transmission sending end, in response to a first operation acting on characters, displaying the characters in an input box in response to a first operation acting on the characters; determining a target screen-transmission code according to input characters; displaying the target screen-transmission code in
(Continued)

the input box; parsing the target screen-transmission code and obtaining an IP address of a screen-transmission receiving end; establishing a connection with the screen-transmission receiving end according to the IP address; sending the target screen-transmission code to the screen-transmission receiving end to obtain a check result of the target screen-transmission code; and if the check result is that a check is passed, sending screen transmission data to the screen-transmission receiving end.

20 Claims, 12 Drawing Sheets

(58) Field of Classification Search
CPC ....... H04L 9/40; H04L 12/2805; H04L 61/00; H04N 21/41; H04N 21/43; H04N 21/426; H04N 21/436; H04N 21/441; H04N 21/475; H04N 21/643; H04N 21/4122; H04N 21/4363; H04N 21/4753; H04N 21/42684; H04N 21/43076; H04N 21/43615; H04N 21/43637; H04N 21/64322; G06F 3/14; G06F 3/1423; G06F 3/1454; H04B 10/114; G09G 2330/026; G09G 2358/00; G09G 2370/04; G09G 2370/025
USPC .......................................................... 709/228
See application file for complete search history.

(56) References Cited

U.S. PATENT DOCUMENTS

| | | | | |
|---|---|---|---|---|
| 2012/0200489 A1* | 8/2012 | Miyashita | ........ | H04N 21/42209 345/156 |
| 2012/0239723 A1* | 9/2012 | Noguchi | ................. | H04L 63/08 709/201 |
| 2013/0176205 A1* | 7/2013 | Yamashita | ............ | G06F 3/0482 345/156 |
| 2014/0253668 A1* | 9/2014 | Yoshida | ................... | H04N 7/15 348/14.07 |
| 2015/0047002 A1* | 2/2015 | Tamura | ................. | H04L 63/104 726/7 |
| 2015/0161066 A1* | 6/2015 | Matsuda | ................. | G06F 21/44 710/4 |
| 2016/0350060 A1* | 12/2016 | Park | ...................... | G06F 3/0484 |
| 2017/0193187 A1* | 7/2017 | Narusawa | ............. | G16H 10/60 |
| 2017/0249120 A1* | 8/2017 | Keränen | ............... | H04L 65/403 |
| 2018/0308003 A1* | 10/2018 | Singh | ..................... | G06N 20/00 |
| 2019/0205083 A1* | 7/2019 | Isonishi | ............. | H04N 21/6437 |
| 2019/0377804 A1* | 12/2019 | Wu | ................... | G06F 16/90335 |
| 2020/0013373 A1* | 1/2020 | Sugaya | .................... | H04N 7/18 |
| 2021/0170228 A1* | 6/2021 | Mochizuki | ........... | G06F 16/908 |
| 2021/0303556 A1* | 9/2021 | Furihata | ................ | G06F 16/245 |
| 2021/0365229 A1* | 11/2021 | Li | .......................... | G06F 3/1454 |
| 2022/0137914 A1* | 5/2022 | Xiong | .................. | G09G 3/2096 345/1.1 |
| 2022/0269490 A1* | 8/2022 | Shimada | ................... | G06F 8/75 |
| 2023/0008070 A1* | 1/2023 | Huang | ............... | H04N 21/4122 |

FOREIGN PATENT DOCUMENTS

| | | | | | |
|---|---|---|---|---|---|
| CN | 108062373 | A | | 5/2018 | |
| CN | 108958678 | A | | 12/2018 | |
| CN | 110287655 | A | | 9/2019 | |
| CN | 111131357 | A | | 5/2020 | |
| CN | 111355820 | A | | 6/2020 | |
| CN | 111510467 | A | | 8/2020 | |
| CN | 116340913 | A | * | 6/2023 | ........... G06F 3/1454 |
| EP | 4087259 | A1 | * | 11/2022 | ........... G06F 3/1454 |

OTHER PUBLICATIONS

Written Opinion issued in corresponding international application No. PCT/CN2021/075986, dated Aug. 31, 2021.

* cited by examiner

INFORMATION PROCESSING METHOD, DEVICE AND STORAGE MEDIUM FOR INPUTTING A SCREEN TRANSMISSION CODE

CROSS-REFERENCE TO RELATED APPLICATIONS

The present application is a continuation of International Application No. PCT/CN2021/075986, filed on Feb. 8, 2021, which claims the benefit of priority to Chinese Patent Application No. 202011399017.0, filed on Dec. 4, 2020. The entire contents of each of the above-identified applications are expressly incorporated herein by reference.

TECHNICAL FIELD

The present disclosure relates to the field of screen transmission technology, in particular to an information processing method, device and storage medium.

BACKGROUND

With the continuous development of technology, various new technologies have emerged, such as screen transmission technology. Through the screen transmission technology, content displayed on an electronic apparatus A may be transmitted to an electronic apparatus B, and displayed by the electronic apparatus B, for example, content displayed on a computer may be transmitted to an interactive white board for display. Before screen transmission, the electronic apparatus A is required to establish a connection with the electronic apparatus B.

In the connection mode of the related art, a user needs to manually input a screen-transmission code of the electronic apparatus B on the electronic apparatus A, so that the electronic apparatus A reversely parses an IP address of the electronic apparatus B based on the screen-transmission code, and establishes a connection with the electronic apparatus B according to the IP address.

However, IP addresses have a large range, in order to make the screen-transmission code and the IP address in a one-to-one correspondence, the screen-transmission code usually has a relatively complex composition, resulting in slow and error-prone manual input by the user.

SUMMARY

The present disclosure provides an information processing method, device and storage medium, to rapidly and accurately input a screen-transmission code.

In a first aspect, an embodiment of the present disclosure provides an information processing method applied to a screen-transmission sending end. The method includes, in response to a first operation acting on characters, displaying the characters in an input box, determining a target screen-transmission code according to input characters, displaying the target screen-transmission code in the input box, parsing the target screen-transmission code and obtaining an IP address of a screen-transmission receiving end, establishing a connection with the screen-transmission receiving end according to the IP address, sending the target screen-transmission code to the screen-transmission receiving end to obtain a check result of the target screen-transmission code, and if the check result is that a check is passed, sending screen transmission data to the screen-transmission receiving end. The input box is an input box of a screen transmission application. A number of characters contained in the target screen-transmission code is greater than a number of the input characters. The target screen-transmission code includes the input characters.

In some embodiments, determining the target screen-transmission code according to the input characters may include, if the number of candidate screen-transmission codes containing the input characters is 1, determining that the candidate screen-transmission code is the target screen-transmission code.

In some embodiments, determining the target screen-transmission code according to the input characters may include, displaying at least one candidate screen-transmission code containing the input characters, and, in response to a second operation acting on the target screen-transmission code, determining the target screen-transmission code. The at least one candidate screen-transmission code includes the target screen-transmission code.

In some embodiments, before displaying the at least one candidate screen-transmission code containing the input characters, the method may further include: determining a character string according to the input characters and an input order of the input characters, and determining that the screen-transmission code containing the character string is the candidate screen-transmission code.

In some embodiments, the method may further include: sending a request message to the screen-transmission receiving end when detecting that the screen transmission application is opened, and receiving the screen-transmission code corresponding to the screen-transmission receiving end. The request message is used to request the screen-transmission receiving end to synchronize a screen-transmission code corresponding to the screen-transmission receiving end to the screen-transmission sending end.

In a second aspect, an embodiment of the present disclosure provides an information processing method applied to a screen-transmission receiving end. The method includes, in response to a startup operation acting on a screen transmission application, triggering a display module to display a screen-transmission code corresponding to the screen-transmission receiving end, sending the screen-transmission code to a screen-transmission sending end, so that the screen-transmission sending end determines that a target screen-transmission code is the screen-transmission code according to user's first operation, and displays the target screen-transmission code in an input box of the screen transmission application, establishing a connection with the screen-transmission sending end, receiving the target screen-transmission code from the screen-transmission sending end, checking the target screen-transmission code to obtain a check result of whether a check is passed, sending the check result to the screen-transmission sending end, and if the check result is that the check is passed, receiving screen transmission data from the screen-transmission sending end. The first operation is used to input characters contained in the target screen-transmission code in the input box, and a number of characters contained in the target screen-transmission code is greater than a number of the input characters.

In some embodiments, before sending the screen-transmission code to the screen-transmission sending end, the method may further include, receiving a request message from the screen-transmission sending end. The request message is sent by the screen-transmission sending end when detecting that the screen transmission application is opened, and the request message is used to request the screen-transmission receiving end to synchronize the screen-transmission code to the screen-transmission sending end.

In a third aspect, an embodiment of the present disclosure provides an information processing device applied to a screen-transmission sending end. The information processing device includes, a processing module, configured to trigger a display module to display characters in an input box in response to a first operation acting on the characters, and determine a target screen-transmission code according to input characters, a transceiver module, configured to send the target screen-transmission code to the screen-transmission receiving end to obtain a check result of the target screen-transmission code. The input box is an input box of a screen transmission application, a number of characters contained in the target screen-transmission code is greater than a number of the input characters, and the target screen-transmission code contains the input characters. The display module is further configured to display the target screen-transmission code in the input box. The processing module is further configured to parse the target screen-transmission code and obtain an IP address of a screen-transmission receiving end, and establish a connection with the screen-transmission receiving end according to the IP address. The processing module is further configured to send screen transmission data to the screen-transmission receiving end through the transceiver module when the check result is that a check is passed.

In some embodiments, the processing module determining the target screen-transmission code according to the input characters includes, when the number of candidate screen-transmission codes containing the input characters is 1, determining that the candidate screen-transmission code is the target screen-transmission code.

In some embodiments, the processing module determining the target screen-transmission code according to the input characters includes, displaying at least one candidate screen-transmission code containing the input characters, wherein the at least one candidate screen-transmission code includes the target screen-transmission code; and in response to a second operation acting on the target screen-transmission code, determining the target screen-transmission code.

In some embodiments, the processing module is further configured to: before the display module displaying the at least one candidate screen-transmission code containing the input characters, determine a character string according to the input characters and an input order of the input characters, and determine that the screen-transmission code containing the character string is the candidate screen-transmission code.

In some embodiments, the transceiver module is further configured to send a request message to the screen-transmission receiving end when detecting that the screen transmission application is opened, and receive the screen-transmission code corresponding to the screen-transmission receiving end. The request message is used to request the screen-transmission receiving end to synchronize a screen-transmission code corresponding to the screen-transmission receiving end to the screen-transmission sending end.

In a fourth aspect, an embodiment of the present disclosure provides an information processing device applied to a screen-transmission receiving end, the information processing device includes a processing module, configured to trigger a display module to display a screen-transmission code corresponding to the screen-transmission receiving end in response to a startup operation acting on a screen transmission application, a transceiver module, configured to send the screen-transmission code to a screen-transmission sending end, so that the screen-transmission sending end determines that a target screen-transmission code is the screen-transmission code according to user's first operation and displays the target screen-transmission code in an input box of the screen transmission application. The first operation is used to input characters contained in the target screen-transmission code in the input box, and a number of characters contained in the target screen-transmission code is greater than a number of the input characters. The processing module is further configured to establish a connection with the screen-transmission sending end. The transceiver module is further configured to receive the target screen-transmission code from the screen-transmission sending end. The processing module is further configured to check the target screen-transmission code to obtain a check result of whether a check is passed. The transceiver module is further configured to send the check result to the screen-transmission sending end, and receive screen transmission data from the screen-transmission sending end when the check result is that the check is passed.

In some embodiments, the transceiver module is further configured to receive a request message from a screen-transmission sending end before sending the screen-transmission code to the screen-transmission sending end, wherein the request message is sent by the screen-transmission sending end when detecting that the screen transmission application is opened, and the request message is used to request the screen-transmission receiving end to synchronize the screen-transmission code to the screen-transmission sending end.

In a fifth aspect, an embodiment of the present disclosure provides an electronic apparatus includes a memory, configured to store program instructions, and a processor, configured to invoke and execute the program instructions in the memory to perform the method according to any one of the first aspect or the second aspect.

In a sixth aspect, an embodiment of the present disclosure provides a computer-readable storage medium, wherein the computer-readable storage medium stores program instructions, and the program instructions, when executed, implement the method according to any one of the first aspect or the second aspect.

In a seventh aspect, an embodiment of the present disclosure provides a computer program product, comprising program instructions that, when executed, implement the method according to any one of the first aspect or the second aspect.

An embodiment of the present disclosure provides an information processing method, device and storage medium. A screen-transmission sending end is configured to: display characters in an input box in response to a first operation acting on the characters, determine a target screen-transmission code according to input characters, display the target screen-transmission code in the input box, parse the target screen-transmission code and obtain an IP address of a screen-transmission receiving end, establish a connection with the screen-transmission receiving end according to the IP address, send the target screen-transmission code to the screen-transmission receiving end to obtain a check result of the target screen-transmission code, and send screen transmission data to the screen-transmission receiving end if the check result is that a check is passed. According to the present disclosure, the target screen-transmission code can be determined when a user inputs the first N characters of the target screen-transmission code, and displayed in the input box, wherein N is less than the number of characters contained in the target screen-transmission code, thereby realizing rapid and accurate input of the screen-transmission code. The input box is an input box of a screen transmission application. The target screen-transmission code contains more characters than the input characters, and the target screen-transmission code contains the input characters.

BRIEF DESCRIPTION OF THE DRAWINGS

In order to describe the technical solutions in the embodiments of the present disclosure or the related art more clearly, the accompanying drawings required in the description of the embodiments or the related art will be briefly introduced below. Obviously, the accompanying drawings in the description below are merely some embodiments of the present disclosure, and for those of ordinary skill in the art, other drawings may be obtained from these drawings without creative efforts.

DETAILED DESCRIPTION

Figure 1A:
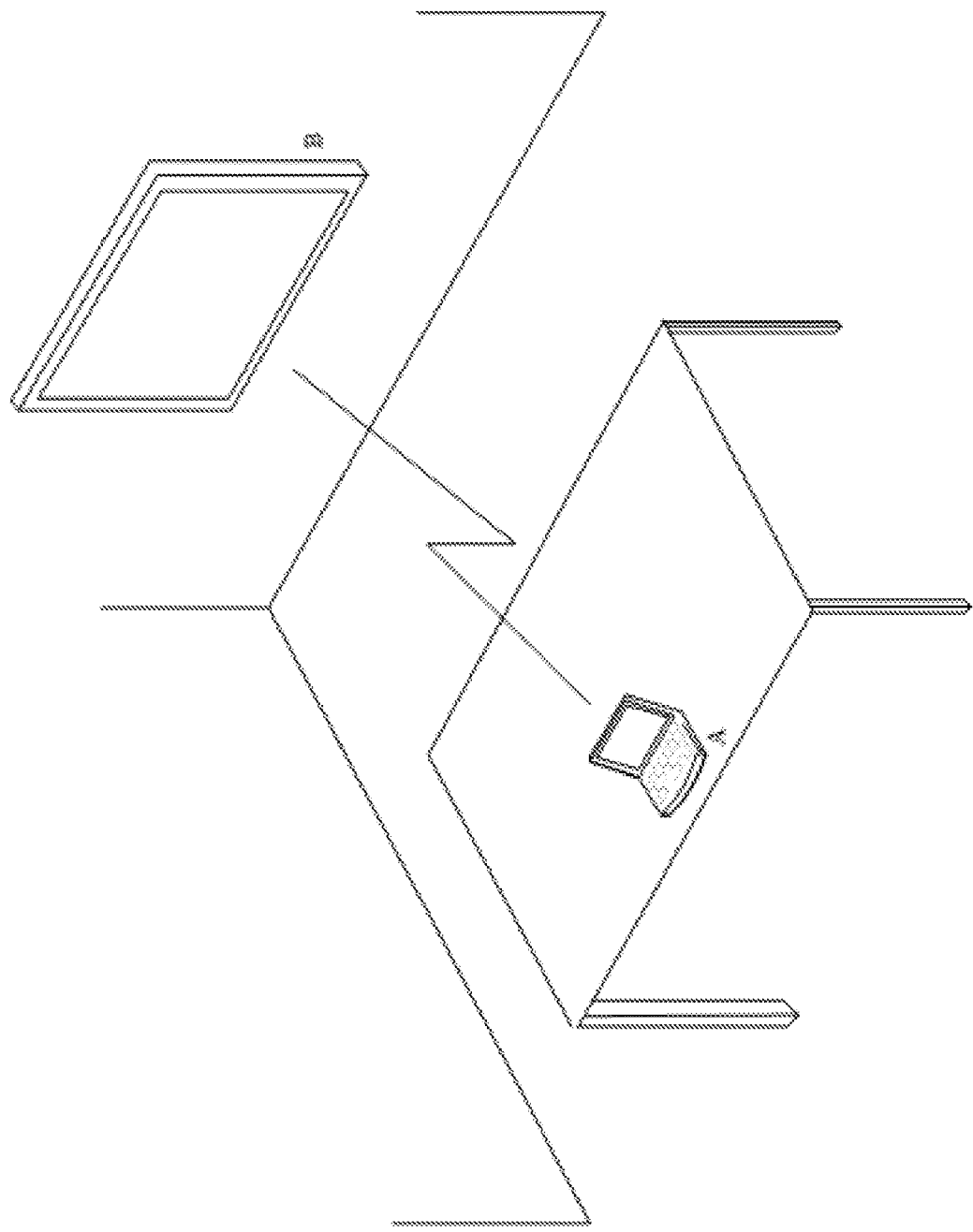
FIG. 1a is an example diagram of an application scenario according to an embodiment of the present disclosure.

The technical solutions in the embodiments of the present disclosure will be described below with reference to the accompanying drawings in the embodiments of the present disclosure. The described embodiments are only some but not all of the embodiments of the present disclosure. Based on the embodiments of the present disclosure, all other embodiments obtained by those of ordinary skill in the art without creative efforts shall fall within the scope of protection of the present disclosure.

The terms "first" and "second" in the description, claims and drawings of the embodiments of the present disclosure are used to distinguish similar objects, and are not necessarily used to describe a specific order or sequence. It should be understood that the data so used may be interchanged under appropriate situations so that the embodiments of the present disclosure described herein, for example, can be implemented in an order other than those illustrated or described herein. In addition, the terms "include" and "have," and any variations thereof, are intended to cover a non-exclusive inclusion, for example, a process, method, system, product, or apparatus that includes a series of steps or units is not necessarily limited to those steps or units that are expressly listed, but may include other steps or units that are not expressly listed or inherent to such process, method, product, or apparatus.

It should be understood that, the term "and/or" as used herein is only an association relationship that describes associated objects, and indicates that three relationships may exist. For example, A and/or B may indicate three cases: A exists alone, A and B exist simultaneously, and B exists alone. "/" indicates a relationship of "or."

Wireless screen transmission is also known as wireless co-screen, flying screen, and screen sharing. In some embodiments, it is to display a screen picture of an electronic apparatus A on the screen of another electronic apparatus B in "real time" through screen transmission technology. Wherein the electronic apparatus A, for example, may be an apparatus such as a mobile phone, a tablet, a notebook, or a computer; and the electronic apparatus B, for example, may be an apparatus such as an interactive white board, a notebook, a computer, a TV, an integrated machine, or a projector.

Content of the picture can include various media information and real-time operation pictures, such as documents, videos, photos, etc. As long as the electronic apparatus A and the electronic apparatus B are in the same local area network environment, the screen picture of the electronic apparatus A can be transmitted to the screen of the electronic apparatus B for display. Exemplarily, both the electronic apparatus A and the electronic apparatus B are installed with a screen transmission application.

Typically, the size of the screen-transmission code is relatively fixed, such as a 6-bit screen-transmission code or an 8-bit screen-transmission code. In some embodiments, the screen-transmission code is obtained by processing the IP address using a screen-transmission-code generation algorithm, and the screen-transmission code and the IP address are in a one-to-one correspondence. Considering that the IP address assigned to the interactive white board is different each time, the screen-transmission code corresponding to the same electronic apparatus also changes as the IP address changes. In this way, the user needs to manually input the screen-transmission code of the electronic apparatus B on the electronic apparatus A before transmitting the screen picture of the electronic apparatus A to the electronic apparatus B. However, IP addresses have a large range in the local area network, in order to make the screen-transmission code and the IP address in a one-to-one correspondence, the screen-transmission code has a relatively complex composition, for example, the screen-transmission code includes English letters and numbers, etc., resulting in slow and error-prone manual input by the user when the user manually inputs the screen-transmission code.

Based on the above problems, the present disclosure provides an information processing method, device and storage medium. Through semi-automatic input, the input efficiency of the screen-transmission code is accelerated, and at the same time, the error probability of the screen-transmission code is reduced, that is, rapid and accurate input of the screen-transmission code can be realized.

Next, an application scenario involved in the present disclosure is described by way of example.

FIG. 1a is an example diagram of an application scenario according to an embodiment of the present disclosure. As shown in FIG. 1a:

Exemplarily, the electronic apparatus A and the electronic apparatus B are in the same local area network, and need to perform screen sharing through the screen transmission technology, wherein the electronic apparatus A is a screen-transmission sending end and the electronic apparatus B is a screen-transmission receiving end. By the information processing method provided in the present disclosure, the screen-transmission code of the electronic apparatus B can be rapidly and accurately input into the electronic apparatus A. In an embodiment, the electronic apparatus A establishes a connection with the electronic apparatus B according to the screen-transmission code, and performs screen transmission processing.

Figure 1B:
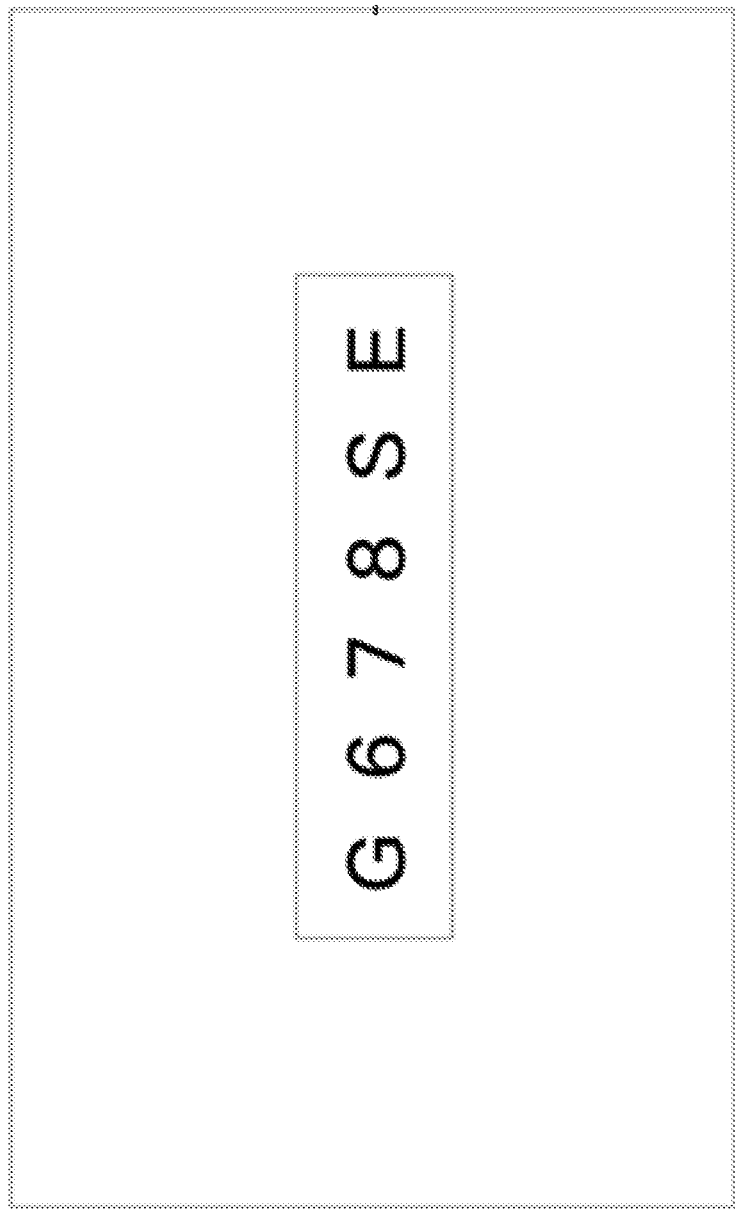
FIG. 1b is an example diagram of an input interface of screen-transmission code according to an embodiment of the present disclosure.

In the example shown in FIG. 1a, the electronic apparatus A takes a notebook as an example, and the electronic apparatus B takes an interactive white board as an example, but the present disclosure is not limited thereto. Wherein the interactive white board is integrated with any one or more of functions such as a projector, an electronic white board, a screen, audio, a TV and a video conference terminal. In an embodiment, the interactive white board is installed with a screen transmission application, and when the user starts the screen transmission application, the interactive white board in response to the startup operation acting on the screen transmission application, generates the screen-transmission code of the interactive white board based on the IP address, and displays the screen-transmission code on the screen of the interactive white board, as shown in FIG. 1b. After seeing the screen-transmission code, the user inputs the screen-transmission code on the screen transmission application interface of the notebook.

It should be noted that the screen-transmission sending end and the screen-transmission receiving end are relative concepts. In two electronic apparatus that perform wireless transmission through the screen transmission technology, one is the screen-transmission sending end, and the other is the screen-transmission receiving end, both of which can be interchanged depending on actual situations. In general, there may be one or more screen-transmission sending ends, which is set according to an application scenario and is not limited in the embodiment.

In some embodiments, the screen transmission application may be pre-installed in the screen-transmission sending end and/or the screen-transmission receiving end, or may be downloaded from a third-party apparatus or server and installed and used when the screen-transmission sending end and/or the screen-transmission receiving end starts the screen transmission application. Wherein the third-party apparatus is not limited in the embodiment. In an embodiment, the screen transmission application is configured to acquire content displayed by the screen-transmission sending end as screen transmission data, and instruct the screen-transmission receiving end to display the content. In an embodiment, a case in which the screen-transmission sending end and the screen-transmission receiving end are both installed with a screen transmission application is taken as an example for description. Wherein the screen transmission application of the screen-transmission sending end is configured to acquire screen transmission data and send the screen transmission data directly or indirectly to the screen-transmission receiving end. In the case of indirect sending, the screen-transmission sending end may send the screen transmission data to the screen-transmission receiving end through a transfer device, which may be a wireless screen transmission device or another device having a data transferring/processing function. The screen transmission application of the screen-transmission receiving end is configured to receive the screen transmission data, and convert the screen transmission data into corresponding content, so as to facilitate display by the screen-transmission receiving end.

Figure 1C:
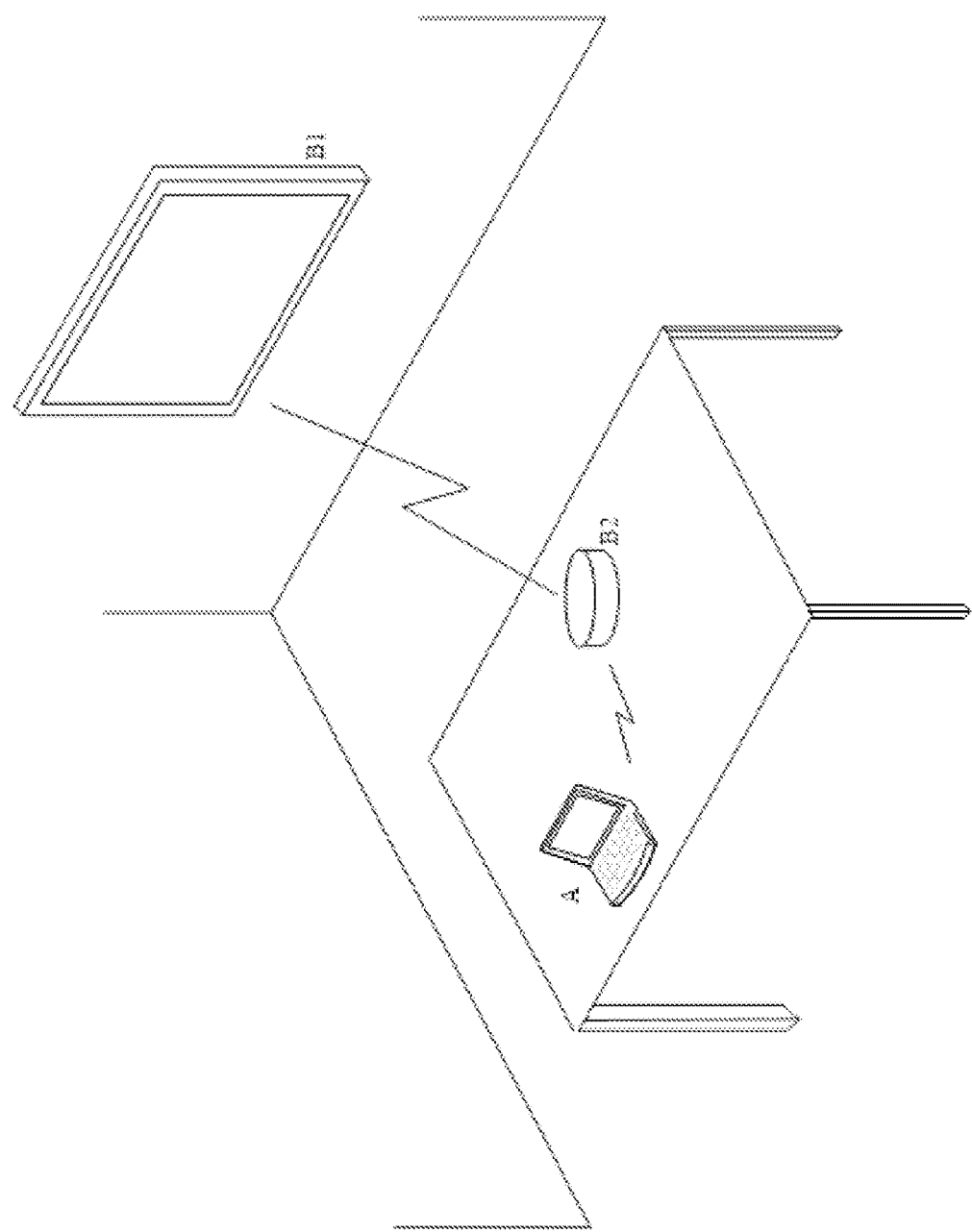
FIG. 1c is an example diagram of an application scenario according to an embodiment of the present disclosure.

It is added that, in the scenario shown in FIG. 1a, the screen-transmission receiving end is an interactive white board which is installed with a screen transmission application and integrated with reception and display functions. In some embodiments, as shown in FIG. 1c, the screen-transmission receiving end may also include two mutually independent apparatus, i.e., a receiving apparatus B2 and a display apparatus B1, wherein the receiving apparatus is installed with a screen transmission application, and the display apparatus is configured to display a screen. Exemplarily, as shown in FIG. 1c, the receiving apparatus B2 may be, in some embodiments, an electronic apparatus such as a receiving box that does not have a display function, and the display apparatus B1 may be an electronic apparatus such as a TV or a projector that has a display function.

In addition, considering that the resolution of the screen of the screen-transmission sending end is different from that of the screen-transmission receiving end, and the screen transmission data is acquired based on the resolution of the screen-transmission sending end. Therefore, in order to display the screen transmission data in the screen of the screen-transmission receiving end, the screen transmission application needs to determine a screen mapping relationship according to the resolutions of the screens of the screen-transmission sending end and the screen-transmission receiving end, and then convert the screen transmission data according to the screen mapping relationship to obtain screen transmission content. It should be noted that, in the embodiment, the screen transmission content and the display content of the screen transmission data are substantially the same, but differing only in resolution.

An information processing method according to the present disclosure will be explained below with reference to the embodiments.

Figure 2:
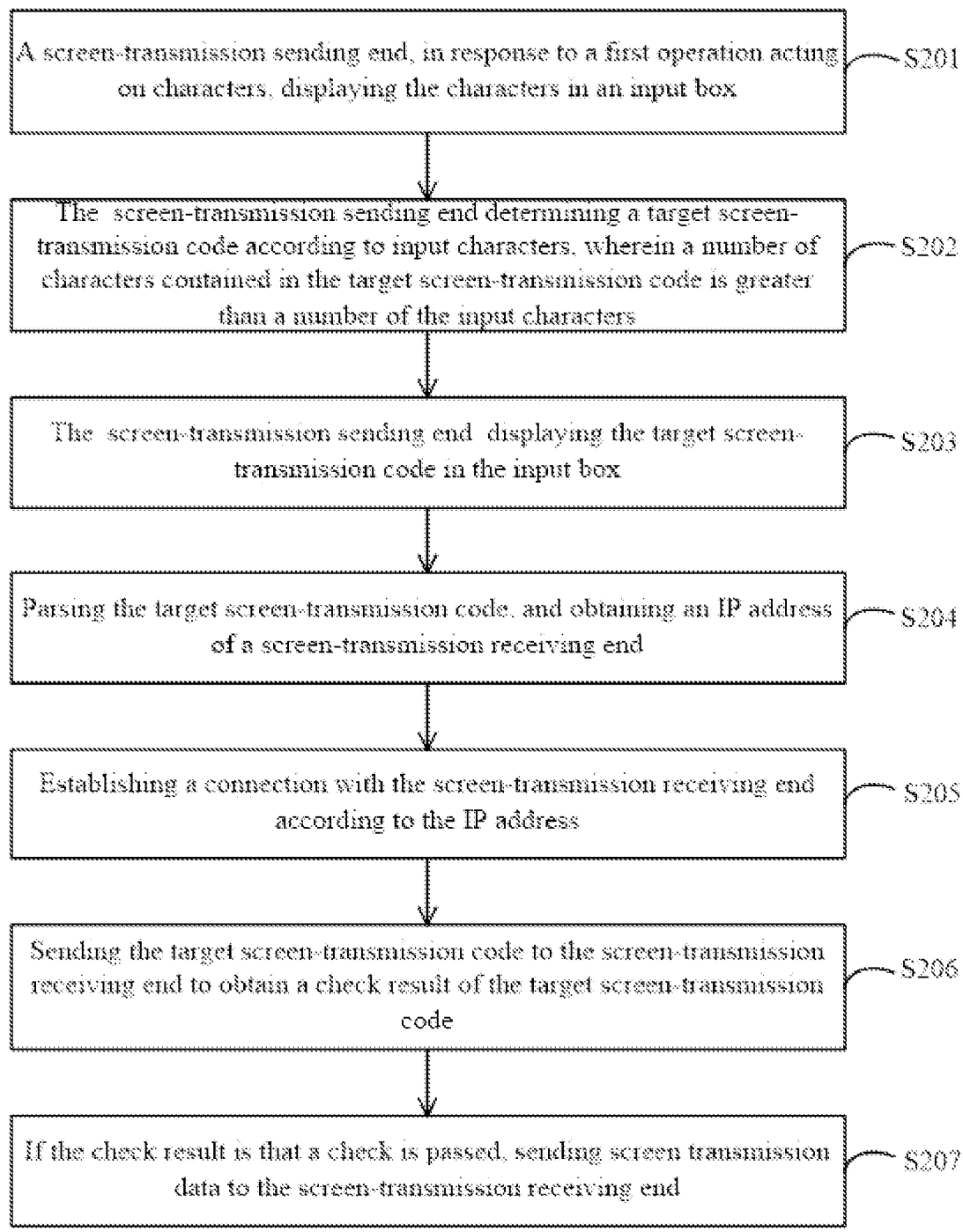
FIG. 2 is a flowchart of an information processing method according to an embodiment of the present disclosure.

FIG. 2 is a flowchart of an information processing method according to an embodiment of the present disclosure. The information processing method may be executed by an information processing device, which may be implemented by software and/or hardware. In the application scenario shown in FIG. 1a or FIG. 1c, the information processing device may be an electronic apparatus A or a chip or circuit of the electronic apparatus A.

Figure 3:
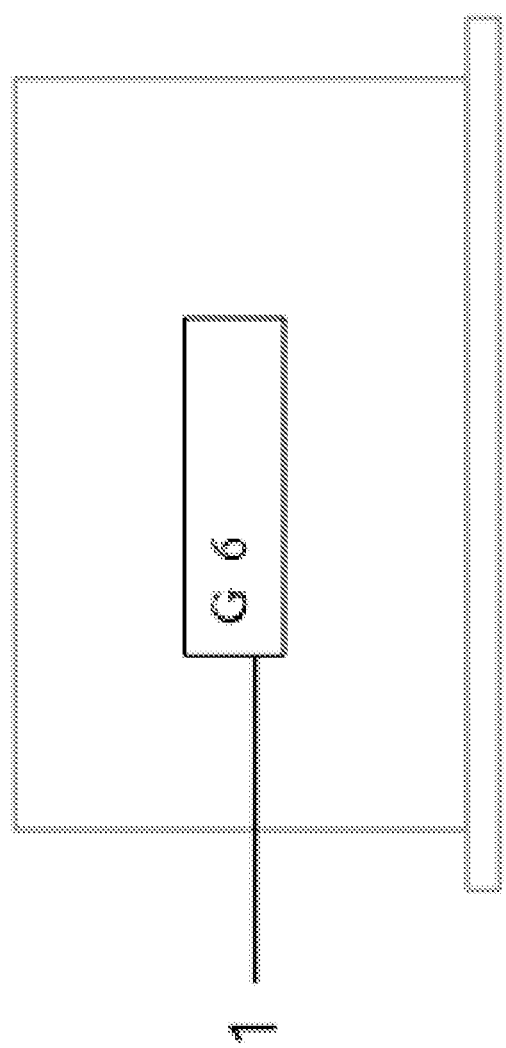
FIG. 3 is an example diagram of another input interface of screen-transmission code according to an embodiment of the present disclosure.

Referring to FIG. 2, the information processing method according to this embodiment includes:

S201: a screen-transmission sending end, in response to a first operation acting on characters, displaying the characters in an input box.

Wherein the input box is an input box of a screen transmission application. As shown in FIG. 3, a user starts the screen transmission application on the screen-transmission sending end, and the screen-transmission sending end and displays an input box 1 in response to the operation. Content in the input box is editable, and the user can input characters contained in a target screen-transmission code in the input box through an input apparatus such as a virtual keyboard at the screen-transmission sending end or a physical keyboard connected to the screen-transmission sending end. Wherein the operation that the user acts on the input apparatus is the first operation.

Taking the notebook shown in FIG. 1a as an example, when the target screen-transmission code is "G678SE," the user acts on two keys (i.e., the letter "G" and the number "6") contained in the keyboard of the notebook in sequence, and after detecting the user's operation, the notebook displays characters "G6" indicated by the corresponding keys in the input box according to the sequence of input.

Figure 4:
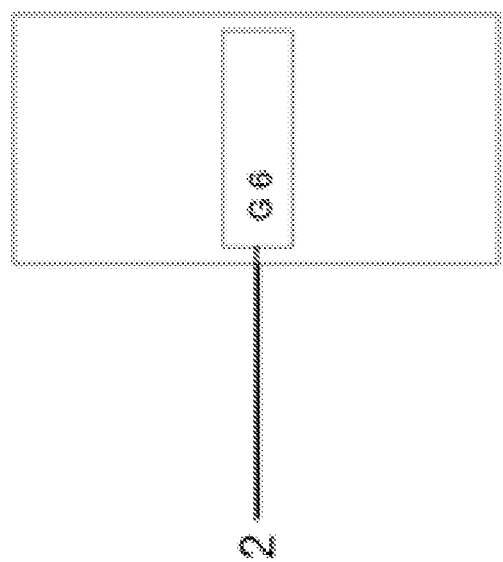
FIG. 4 is an example diagram of yet another input interface of screen-transmission code according to an embodiment of the present disclosure.

If the screen-transmission sending end is a mobile phone, as shown in FIG. 4, the input box on the mobile phone and its display content are similar to those in FIG. 3. In FIG. 4, the input box is identified as "2."

S202: the screen-transmission sending end determining a target screen-transmission code according to input characters, wherein a number of characters contained in the target screen-transmission code is greater than a number of the input characters, and the target screen-transmission code contains the input characters.

The screen-transmission sending end saves or acquires at least one screen-transmission code in advance, and the screen-transmission code may be a screen-transmission code that is previously input into the screen-transmission sending end or received by the screen-transmission sending end from the screen-transmission receiving end. The screen-transmission sending end matches the input characters in this screen transmission processing with the known screen-transmission codes, to determine the target screen-transmission code.

Wherein the number of target screen-transmission codes determined according to the input characters is at least one. In some embodiments, the screen-transmission sending end determining the target screen-transmission code according to the input characters may include, if the number of candidate screen-transmission code containing the input characters is 1, determining that the candidate screen-transmission code is the target screen-transmission code. In another implementation, if the number of candidate screen-transmission codes containing the input characters is at least two, the user continues to manually input the remaining characters until the screen-transmission sending end can uniquely determine the target screen-transmission code according to the input characters.

Through this step, the target screen-transmission code can be determined after the user manually inputs only a small amount of characters of the target screen-transmission code, thereby realizing complete display of the target screen-transmission code in the input box. Compared with the implementation in which the user manually inputs each character contained in the target screen-transmission code one by one, the input efficiency is obviously accelerated, and the probability of error is relatively low.

S203: the screen-transmission sending end displaying the target screen-transmission code in the input box.

After determining the target screen-transmission code, the screen-transmission sending end may establish a connection with the screen-transmission receiving end according to the target screen-transmission code, and check the target screen-transmission code and transmit screen transmission data.

S204: parsing the target screen-transmission code, and obtaining an IP address of a screen-transmission receiving end.

In some embodiments, this step and S203 may be performed simultaneously, and the execution order of S203 and S204 is not limited in the embodiment of the present disclosure.

S205: establishing a connection with the screen-transmission receiving end according to the IP address.

S206: sending the target screen-transmission code to the screen-transmission receiving end to obtain a check result of the target screen-transmission code.

S207: if the check result is that a check is passed, sending screen transmission data to the screen-transmission receiving end.

Wherein the screen transmission data may include content currently displayed at the screen-transmission sending end, such as a picture, a video, and the like. In some embodiments, the screen transmission data may further include audio content currently played by the screen-transmission sending end.

It should also be noted that relevant descriptions of S204 to S207 can refer to the related technology, and will not be repeated here. Due to rapid and accurate input of the screen-transmission code, the transmission delay of the screen transmission data can also be reduced in the embodiment of the present disclosure.

In the embodiment of the present disclosure, a screen-transmission sending end performs the follows: displaying characters in an input box in response to a first operation acting on the characters, wherein the input box is an input box of a screen transmission application; determining a target screen-transmission code according to input characters, wherein the target screen-transmission code contains more characters than the input characters, and the target screen-transmission code including the input characters; displaying the target screen-transmission code in the input box, and parsing the target screen-transmission code to obtain an IP address of a screen-transmission receiving end; establishing a connection with the screen-transmission receiving end according to the IP address; sending the target screen-transmission code to the screen-transmission receiving end to obtain a check result of the target screen-transmission code; and sending screen transmission data to the screen-transmission receiving end if the check result is that a check is passed. According to the present disclosure, the target screen-transmission code can be determined when a user inputs the first N characters of the target screen-transmission code, and displayed in the input box, wherein N is less than the number of characters contained in the target screen-transmission code, thereby realizing rapid and accurate input of the screen-transmission code.

On the basis of the above embodiment, since the number of target screen-transmission codes determined according to the input characters is at least one, at this point, the screen-transmission sending end may further display at least one candidate screen-transmission code containing the input characters, respond to a second operation acting on the target screen-transmission code, and determine the target screen-transmission code, wherein the at least one candidate screen-transmission code includes the target screen-transmission code. That is, the screen-transmission sending end determining the target screen-transmission code according to the input characters may include: displaying at least one candidate screen-transmission code containing the input characters, wherein the at least one candidate screen-transmission code includes the target screen-transmission code; determining the target screen-transmission code in response to a second operation acting on the target screen-transmission code.

Figure 5:
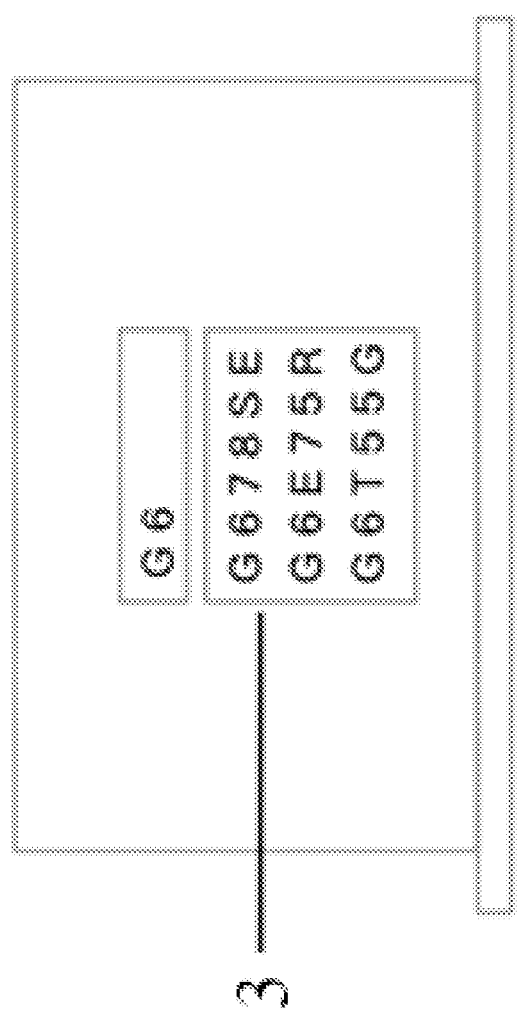
FIG. 5 is an example diagram of yet another input interface of screen-transmission code according to an embodiment of the present disclosure.
Figure 6:
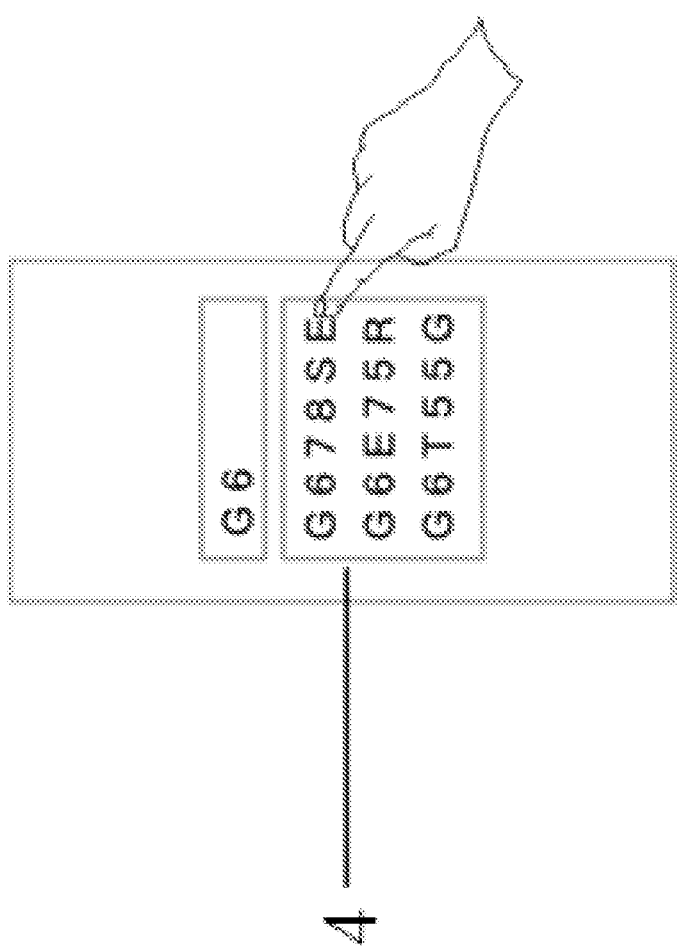
FIG. 6 is an example diagram of yet another input interface of screen-transmission code according to an embodiment of the present disclosure.

Still taking a case in which the target screen-transmission code is "G678SE" as an example, after the user inputs "G6," the screen-transmission sending end displays, according to the input characters "G6," a candidate screen-transmission code containing "G6," For example, FIG. 5 shows an schematic diagram of an interface when the screen-transmission sending end is a notebook, wherein the reference numeral 3 is used to identify at least one candidate screen-transmission code that is listed and displayed. FIG. 6 shows an schematic diagram of an interface when the screen-transmission sending end is a mobile phone, and the reference numeral 4 is used to identify at least one candidate screen-transmission code that is listed and displayed. Wherein the candidate screen-transmission codes are "G678SE," "G6E75R," and "G6T55G," including the target screen-transmission code "G678SE."

At this point, the user can select from the listed candidate screen-transmission codes without having to continue to input the remaining characters. In one embodiment, the user may select the target screen-transmission code through a second operation, as shown in FIG. 6. Accordingly, the screen-transmission sending end determines the target screen-transmission code, and displays the target screen-transmission code in the input box.

In the embodiment of the present disclosure, the screen-transmission sending end performs the follows: displaying characters in an input box in response to a first operation acting on the characters, wherein the input box is an input box of a screen transmission application; displaying at least one candidate screen-transmission code containing the input characters, wherein the at least one candidate screen-transmission code includes the target screen-transmission code; responding to a second operation acting on the target screen-transmission code, and displaying the target screen-transmission code in the input box. According to the present disclosure, when the user inputs the first N characters (a small amount of characters) of the target screen-transmission code, at least one candidate screen-transmission code including the target screen-transmission code can be listed and displayed by matching for the user to select, wherein N is less than the number of characters contained in the target screen-transmission code, so that the user can select the target screen-transmission code by the second operation acting on the target screen-transmission code, and the screen-transmission sending end displays the target screen-transmission code in the input box in response to the second operation, thereby realizing rapid and accurate input of the screen-transmission code without manually inputting a complete and complex target screen-transmission code.

After a complete screen-transmission code is input in the input box of the screen-transmission sending end, the screen-transmission sending end establishes a connection with the screen-transmission receiving end. In the related art, after the user inputs the screen-transmission code, it needs to wait for matching of 2-3 s to know whether the screen-transmission code is correctly input or whether the screen-transmission sending end and the screen-transmission receiving end corresponding to the screen-transmission code are in the same local area network, thus the feedback is relatively slow. While in the present disclosure, the user can select an input screen-transmission code after inputting a small amount of characters, and if the screen-transmission sending end cannot query a matched apparatus, it can confirm that the input is wrong or the network environment is abnormal, hence the feedback is more timely and accurate, and the human-computer interaction experience is greatly improved.

In the above embodiment, before the screen-transmission sending end displaying the at least one candidate screen-transmission code containing the input characters, the method may further include: determining a candidate screen-transmission code according to the input characters and an input order of the input characters. In one embodiment, determining the candidate screen-transmission code according to the input characters and the input order of the input characters may include: determining a character string according to the input characters and the input order of the input characters; and determining that the screen-transmission code containing the character string is the candidate screen-transmission code.

It can be understood that at least one candidate screen-transmission code listed and displayed at the screen-transmission sending end is stored in the screen-transmission sending end in advance, or acquired by the screen-transmission sending end from other apparatus. In some embodiments, before determining that the screen-transmission code containing the character string is the candidate screen-transmission code, the information processing method may further include: receiving the screen-transmission code from the screen-transmission receiving end.

In some embodiments, the screen-transmission code is forwarded through a network connection apparatus. That is, the network connection apparatus, as a relay apparatus, communicates with the screen-transmission receiving end and the screen-transmission sending end respectively, and forwards information from the screen-transmission receiving end to the screen-transmission sending end, and/or forwards the information from the screen-transmission sending end to the screen-transmission receiving end. Wherein the network connection apparatus may be, for example, a network connection apparatus applicable in a local area network such as a router.

In some embodiments, the above information processing method may further include: sending a request message to the screen-transmission receiving end when detecting that the screen transmission application is opened, wherein the request message is used to request the screen-transmission receiving end to synchronize a screen-transmission code corresponding to the screen-transmission receiving end to the screen-transmission sending end; and receiving the screen-transmission code corresponding to the screen-transmission receiving end.

Figure 7:
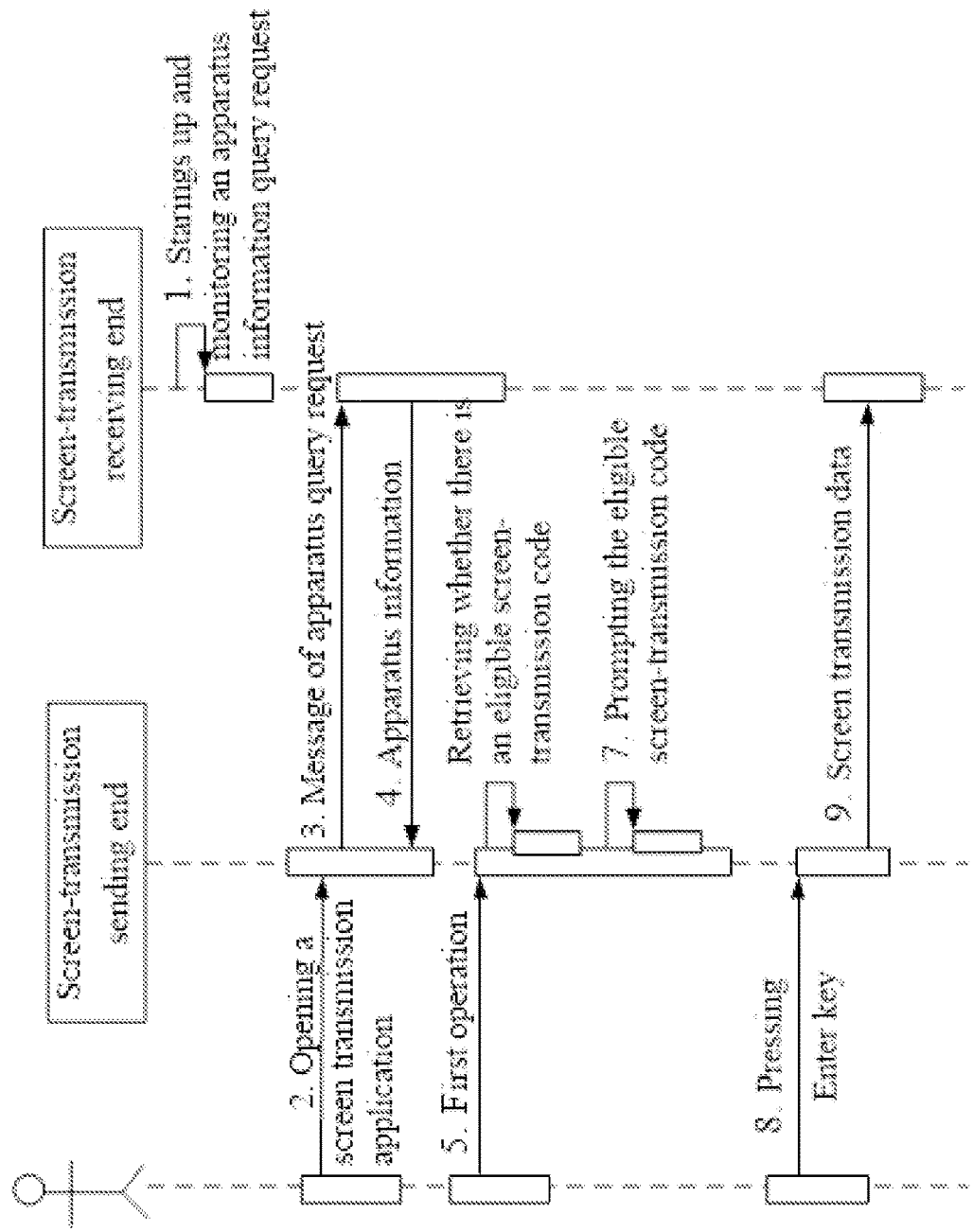
FIG. 7 is a diagram of an application instance of an information processing method according to an embodiment of the present disclosure.

Exemplarily, as shown in FIG. 7, an application instance of screen transmission is introduced:

1. After power-on and startup, the screen-transmission receiving end starts up and monitors an apparatus information query request.

2. A user opens the screen transmission application at the screen-transmission sending end.

3. In response to the operation of opening the screen transmission application by the user (i.e., detecting that the screen transmission application is opened), the screen-transmission sending end sends a message of apparatus query request.

In this example, the message of apparatus query request is the request message described above.

4. The screen-transmission receiving end returns apparatus information to the screen-transmission sending end after receiving the message of apparatus query request from the screen-transmission sending end.

In this example, the apparatus information includes, but not limited to, a screen-transmission code of the screen-transmission receiving end.

5. The user inputs a first operation acting on characters through an input apparatus such as a keyboard and/or a mouse to input the characters in an input box of the screen transmission application.

6. The screen-transmission sending end displays the characters in the input box in response to the first operation, and retrieves, according to the input characters, whether there is an eligible screen-transmission code.

This step is a step of determining the target screen-transmission code according to the input characters.

"Eligible" here can be understood to contain the input characters (i.e., the characters displayed in the input box).

If there is an eligible screen-transmission code, step 7 is performed; if there is no eligible screen-transmission code, no relevant prompt will be given, and the user continues to input characters.

7. The screen-transmission sending end prompts the eligible screen-transmission code.

Here, "an eligible screen-transmission code" is the candidate screen-transmission code as described above. In some embodiments, the screen-transmission sending end displays candidate screen-transmission codes in the form of a list.

8. In response to the user pressing the return key (for example, the Enter key on the keyboard), the screen-transmission sending end complements the screen-transmission code in the input box, that is, displays the target screen-transmission code in the input box.

9. Transmission of screen transmission data is performed between the screen-transmission sending end and the screen-transmission receiving end.

Figure 8:
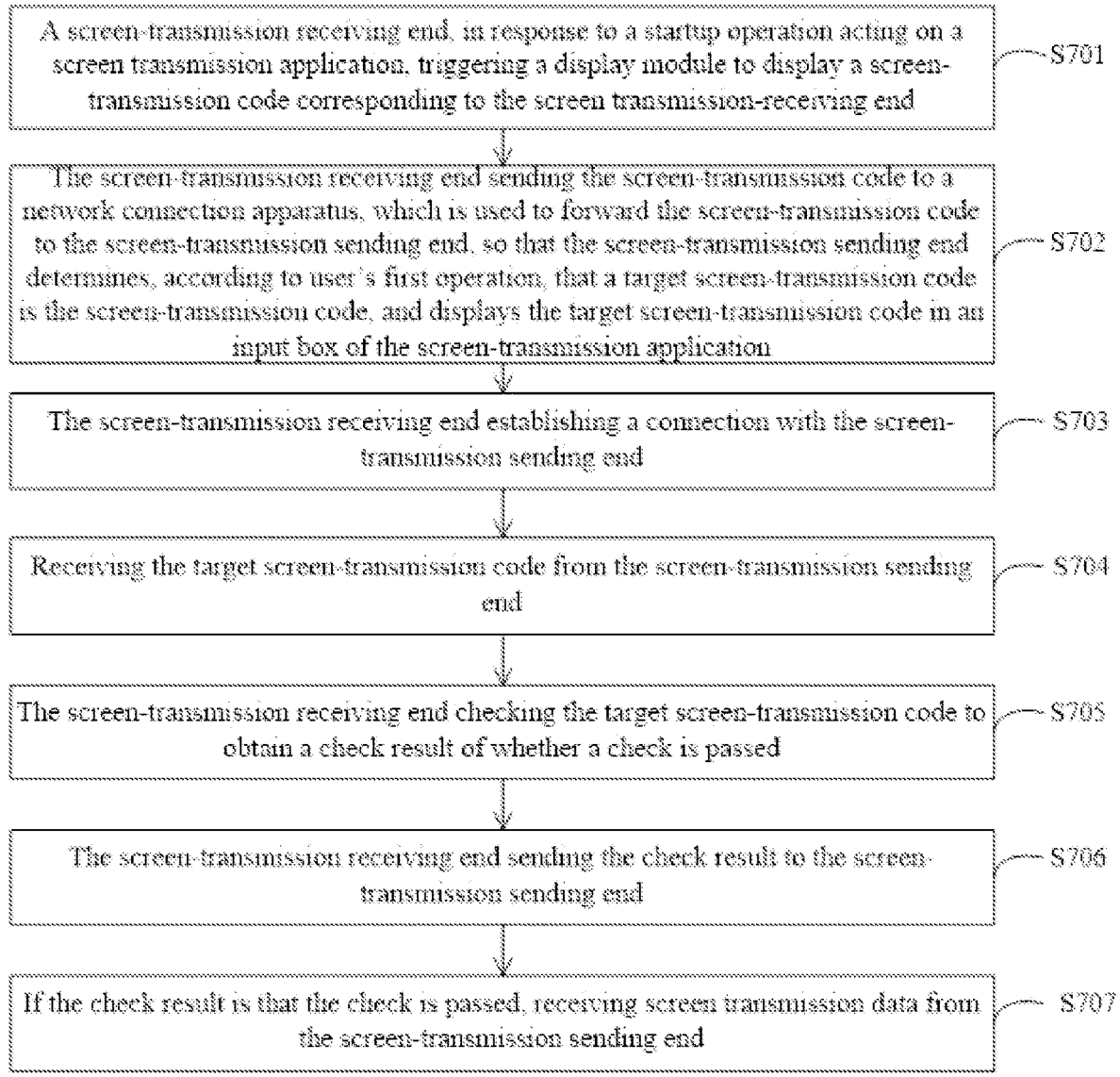
FIG. 8 is a flowchart of another information processing method according to an embodiment of the present disclosure.

As described earlier, the screen-transmission receiving end is installed with a screen transmission application, and when the user starts the screen transmission application, as shown in FIG. 8, the screen-transmission receiving end performs the following operations:

S701: the screen-transmission receiving end, in response to a startup operation acting on a screen transmission application, triggering a display module to display a screen-transmission code corresponding to the screen-transmission receiving end.

Exemplarily, as described earlier, the screen-transmission receiving end may be an interactive white board shown in FIG. 1*a*, which is installed with the screen transmission application and integrated with reception and display functions. In this scenario, the display module is integrated in the interactive white board, or the screen-transmission receiving end may be two mutually independent apparatus, i.e., a receiving apparatus B2 and a display apparatus B1 shown in FIG. 1*c*, wherein the receiving apparatus is installed with a screen transmission application, and the display apparatus is configured to display a screen. In this scenario, the step includes: the receiving apparatus B2 triggering the display apparatus B1 to display the screen-transmission code corresponding to the screen-transmission receiving end in response to the startup operation acting on the screen transmission application. That is, the display module is the display apparatus B1.

S702: the screen-transmission receiving end sending the screen-transmission code to a screen-transmission sending end, so that the screen-transmission sending end determines, according to user's first operation, that a target screen-transmission code is the screen-transmission code and displays the target screen-transmission code in an input box of the screen transmission application.

Wherein the first operation is used to input characters contained in the target screen-transmission code in the input box, and the target screen-transmission code contains more characters than input characters.

In an embodiment, through a service discovery technology of local area network, the screen-transmission receiving end multicasts or broadcasts information (containing a screen-transmission code) of the screen-transmission receiving end to corresponding apparatus in the local area network, and floods the screen-transmission code of the screen-transmission receiving end to other apparatus in the local area network. Accordingly, after receiving the screen-transmission code, the screen-transmission sending end buffers the screen-transmission code, so that the user can quickly match the target screen-transmission code when inputting.

Through the service discovery protocol of local area network, the screen-transmission sending end can know apparatus information of the screen-transmission receiving end in the local area network in advance, such as the screen-transmission code, the IP address, etc. Therefore, when the user inputs a small amount of characters, the screen-transmission sending end can filter out eligible apparatus without manually inputting a complete and complex screen-transmission code, thereby improving the input efficiency of the screen-transmission code.

S703: the screen-transmission receiving end establishing a connection with the screen-transmission sending end.

S704: receiving the target screen-transmission code from the screen-transmission sending end.

S705: the screen-transmission receiving end checking the target screen-transmission code to obtain a check result of whether a check is passed.

If the target screen-transmission code is the screen-transmission code of the screen-transmission receiving end, the check result is that the check is passed; if the target screen-transmission code is not the screen-transmission code of the screen-transmission receiving end, the check result is that the check is not passed.

S706: the screen-transmission receiving end sending the check result to the screen-transmission sending end.

S707: if the check result is that the check is passed, receiving screen transmission data from the screen-transmission sending end.

An information processing method of the embodiment of the present disclosure displays a screen-transmission code in response to a startup operation acting on the screen transmission application, and sends the screen-transmission code to the screen-transmission sending end, so that the screen-transmission sending end determines that the target screen-transmission code is the screen-transmission code according to a first operation of the user, and displays the target screen-transmission code in the input box of the screen transmission application, thereby realizing rapid and accurate input of the screen-transmission code.

In addition, since the screen-transmission code is input rapidly and accurately at the screen-transmission sending end, the transmission delay of the screen transmission data can also be reduced in the embodiment of the present disclosure.

In an embodiment, if the screen-transmission sending end does not match the target screen-transmission code based on the input characters (at this point, it may be because the network administrator may have disabled the service discovery technology of local area network), the user needs to continue to input the remaining characters, and the screen-transmission sending end waits for the user to input a complete target screen-transmission code, and then parses an IP address of the screen-transmission receiving end according to the target screen-transmission code, and searches the local area network for whether the IP address exists. If the IP address exists in the local area network, the screen-transmission sending end establishes a connection with the screen-transmission receiving end and performs a screen transmission processing; or, if the IP address does not exist in the local area network, the connection between the screen-transmission sending end and the screen-transmission receiving end fails, and the screen transmission processing cannot be performed.

In addition, considering information security and other factors, in order to avoid mistakenly projecting the screen picture of the screen-transmission sending end to other screen-transmission receiving ends (i.e., non-target screen-transmission receiving ends), in this case, before the screen-transmission sending end displaying the target screen-transmission code in the input box in response to a second operation acting on the target screen-transmission code, the information processing method may further includes, determining that the number of candidate screen-transmission codes is 1. That is, only when the number of candidate screen-transmission codes is 1, the user can perform select input, otherwise still require manual input.

In some embodiments, corresponding to the above embodiment in which the screen-transmission sending end sends the request message, before the screen-transmission receiving end sending the screen-transmission code to the screen-transmission sending end, the information processing method may further include: the screen-transmission receiving end receiving the request message from the screen-transmission sending end. The request message is sent by the screen-transmission sending end when detecting that the screen transmission application is opened, and the request message is used to request the screen-transmission receiving end to synchronize the screen-transmission code to the screen-transmission sending end.

The following is the device embodiment of the present disclosure, which can be used to execute the above method embodiment of the present disclosure. For details not disclosed in the device embodiment of the present disclosure, reference may be made to the above method embodiment of the present disclosure.

Figure 9:
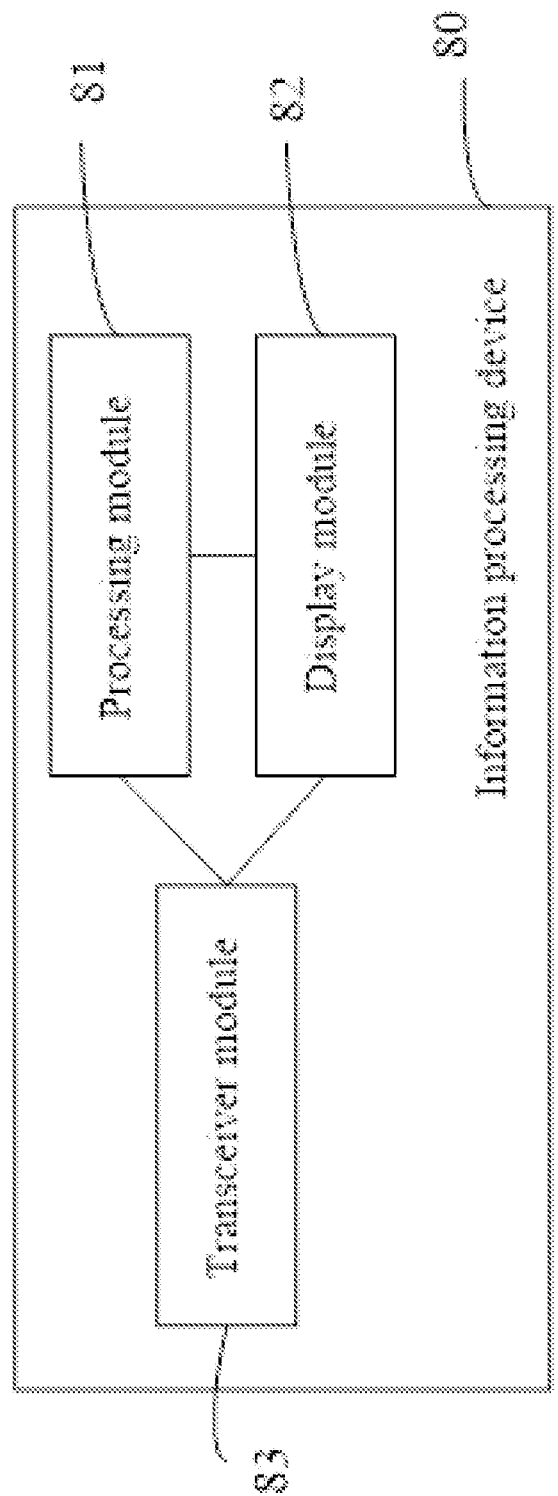
FIG. 9 is a schematic diagram of structures of an information processing device according to an embodiment of the present disclosure.

FIG. 9 is a schematic diagram of structures of an information processing device according to an embodiment of the present disclosure. The information processing device may be implemented by software and/or hardware. In practical applications, the information processing device may be integrated in the screen-transmission sending end as described earlier.

As shown in FIG. 9, the information processing device 80 includes: a processing module 81, a display module 82, and a transceiver module 83. Wherein the processing module 81 is configured to trigger the display module 82 to display characters in an input box of a screen transmission application in response to a first operation acting on the characters; and determine a target screen-transmission code according to the input characters, wherein the target screen-transmission code contains more characters than the input characters, and the target screen-transmission code includes the input characters.

The display module 82 is further configured to display the target screen-transmission code in the input box.

The processing module 81 is further configured to parse the target screen-transmission code to obtain an IP address of a screen-transmission receiving end; and establish a connection with the screen-transmission receiving end according to the IP address.

The transceiver module 83 is configured to send the target screen-transmission code to the screen-transmission receiving end to obtain a check result of the target screen-transmission code.

The processing module 81 is further configured to send screen transmission data to the screen-transmission receiving end through the transceiver module 83 when the check result is that a check is passed.

In some embodiments, the processing module 81 determining the target screen-transmission code according to the input characters may include: when the number of candidate screen-transmission codes containing the input characters is 1, determining that the candidate screen-transmission code is the target screen-transmission code.

In some embodiments, the processing module 81 determining the target screen-transmission code according to the input character may include: displaying at least one candidate screen-transmission code containing the input characters, wherein the at least one candidate screen-transmission code includes the target screen-transmission code; and determining the target screen-transmission code in response to a second operation acting on the target screen-transmission code.

In some embodiments, the processing module 81 is further configured to: before the display module 82 displaying the at least one candidate screen-transmission code containing the input characters, determine a candidate screen-transmission code according to the input characters and an input order of the input characters.

In some embodiments, the processing module 81 determining the candidate screen-transmission code according to the input character and the input order of the input characters may include: determining a character string according to the input characters and the input order of the input characters, and determining that a screen-transmission code containing the character string is the candidate screen-transmission code.

In an embodiment, the transceiver module 83 is further configured to send a request message to the screen-transmission receiving end when detecting that the screen transmission application is opened, wherein the request message is used to request the screen-transmission receiving end to synchronize the screen-transmission code corresponding to the screen-transmission receiving end to the screen-transmission sending end; and receive the screen-transmission code corresponding to the screen-transmission receiving end.

An information processing device of the embodiment of the present disclosure is configured to: display characters in an input box in response to a first operation acting on the characters; determine a target screen-transmission code according to the input characters, wherein the target screen-transmission code contains more characters than the input characters, and the target screen-transmission code contains the input characters; display the target screen-transmission code in the input box; parsing the target screen-transmission code to obtain an IP address of a screen-transmission receiving end; establish a connection with the screen-transmission receiving end according to the IP address; send the target screen-transmission code to the screen-transmission receiving end to obtain a check result of the target screen-transmission code; and send screen transmission data to the screen-transmission receiving end if the check result is that a check is passed. According to the present disclosure, the target screen-transmission code can be determined when a user inputs the first N characters of the target screen-transmission code, and displayed in the input box, wherein N is less than the number of characters contained in the target screen-transmission code, thereby realizing rapid and accurate input of the screen-transmission code. In addition, the transmission delay of the screen transmission data can be reduced in this embodiment of the present disclosure.

In addition, in practical applications, the information processing device shown in FIG. 9 may be integrated into the screen-transmission receiving end as described earlier. In that case:

The processing module 81 is configured to trigger the display module 82 to display a screen-transmission code corresponding to the screen-transmission receiving end in response to a startup operation acting on a screen transmission application.

The transceiver module 83 is configured to send the screen-transmission code to a screen-transmission sending end, so that the screen-transmission sending end determines that a target screen-transmission code is the screen-transmission code according to user's first operation and displays the target screen-transmission code in an input box of the screen transmission application, wherein the first operation is used to input characters contained in the target screen-transmission code in the input box, and the target screen-transmission code contains more characters than input characters.

In some embodiments, the transceiver module 83 may be further configured to receive a request message from the screen-transmission sending end before the screen-transmission code being sent to the screen-transmission sending end. Wherein the request message is sent by the screen-transmission sending end when detecting that the screen transmission application is opened, and the request message is used to request the screen-transmission receiving end to synchronize the screen-transmission code to the screen-transmission sending end.

An information processing device of the embodiment of the present disclosure triggers a display module to display a screen-transmission code in response to a startup operation acting on a screen transmission application, and sends the screen-transmission code to a screen-transmission sending end, so that the screen-transmission sending end determines that a target screen-transmission code is the screen-transmission code according to user's first operation and displays the target screen-transmission code in the input box, wherein the first operation is used to input characters contained in the target screen-transmission code in the input box of the screen transmission application, and the target screen-transmission code contains more characters than input characters. Thereby it realizes rapid and accurate input of the screen-transmission code. In addition, the transmission delay of the screen transmission data can be reduced in this embodiment of the present disclosure.

Figure 10:
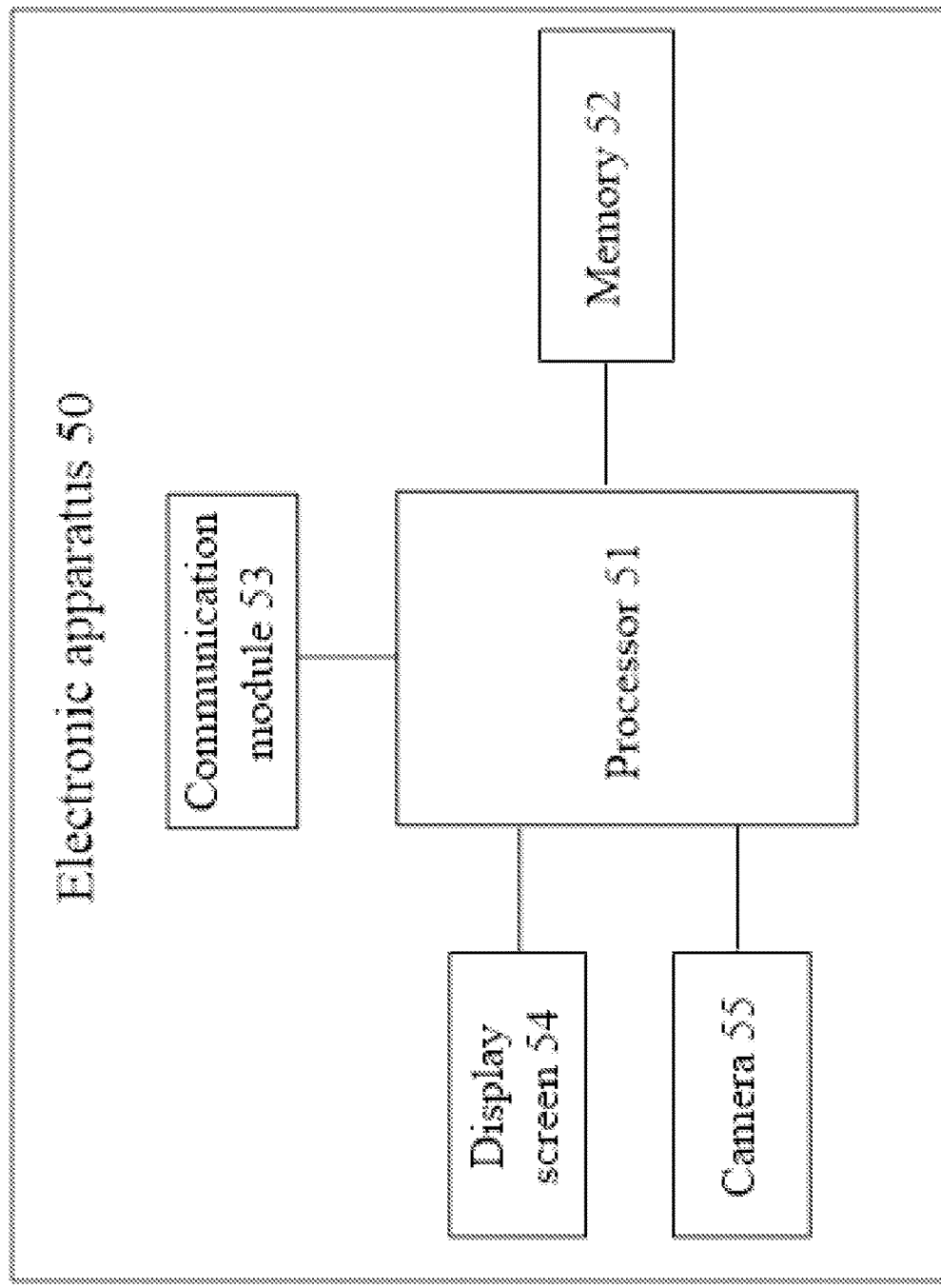
FIG. 10 is a schematic diagram of structures of an electronic apparatus according to an embodiment of the present disclosure.

FIG. 10 is a schematic diagram of structures of an electronic apparatus according to an embodiment of the present disclosure. As shown in FIG. 10, the electronic apparatus 50 includes: a processor 51, a memory 52 connected with the processor 51, a communication module 53, and a display screen 54.

The processor 51 may include one or more processing units. For example, the processor 51 may be a Central Processing Unit (CPU), a Digital Signal Processor (DSP), an Application Specific Integrated Circuit (ASIC), or the like. A general purpose processor may be a microprocessor, or may be any conventional processor or the like. Steps of the method disclosed in the present disclosure may be directly performed by a hardware processor or performed by a combination of hardware and software modules in the processor.

The memory 52 may be configured to store program instructions. The memory 52 may include a program storage area and a data storage area. Wherein the program storage area may store an operating system, an application program required by at least one function (such as a sound playing function), and the like. The data storage area may store data (such as audio data etc.) created during use of the electronic apparatus 50, and the like. Further, the memory 52 may include a high-speed Random Access Memory, and may further include a non-volatile memory such as at least one disk storage device, a flash memory device, a Universal Flash Storage (UFS), and the like. The processor 51 executes various functional applications of the electronic apparatus 50 and data processing by running program instructions stored in the memory 52.

The communication module 53 may provide a solution for wireless communication such as 2G/3G/4G/5G applied on the electronic apparatus 50. The communication module 53 may receive an electromagnetic wave by an antenna, perform processing such as filtering and amplification on the received electromagnetic wave, and transmit it to a modem processor for demodulation. The communication module 53 may also amplify a signal modulated by the modem processor, and convert it into an electromagnetic wave through the antenna for radiation. In some embodiments, at least a portion of the functional modules of the communication module 53 may be provided in the processor 51. In some embodiments, at least a portion of the functional modules of the communication module 53 and at least a portion of the modules of the processor 51 may be provided in the same device.

The display screen 54 is configured to display a picture, such as an image, a video, or the like. The display screen 54 includes a display panel. The display panel may be a Liquid Crystal Display (LCD), an Organic Light Emitting Diode (OLED), an Active-Matrix Organic Light Emitting Diode (AMOLED), a Flex Light-Emitting Diode (FLED), a Mini-LED, a Micro-LED, a Micro-OLED, a Quantum Dot Light Emitting Diode (QLED), or the like. The display panel may receive a touch operation input by a user through a finger or an input apparatus. Wherein the input apparatus includes, but not limited to, a stylus, an infrared stylus, and/or a capacitive stylus.

In some embodiments, the electronic apparatus 50 further includes a camera 55, and the like.

The camera 55 may capture an image or a video. For example, the camera 55 may capture a video under the control of the processor 51 and store the video to the memory 52.

It should be noted that the number of the memory 52 and the processor 51 is not limited in this embodiment of the present disclosure and may be one or more, and FIG. 10 illustrates one memory 52 and one processor 51 as an example. The memory 52 and the processor 51 may be wired or wirelessly connected in various ways, such as through a bus. In practical applications, the electronic apparatus 50 may be a computer, a mobile phone, a tablet, a PDA, an interactive white board, or the like.

The bus may be an Industry Standard Architecture (ISA) bus, a Peripheral Component Interconnect (PCI) bus, an Extended Industry Standard Architecture (EISA) bus, or the like. The bus can be divided into an address bus, a data bus, a control bus, and the like. For ease of illustration, the bus in the drawings of the present disclosure is not limited to only one bus or one type of bus.

The electronic apparatus of this embodiment may be configured to execute the technical solution in the above method embodiment, and its implementation principle and technical effect are similar, which are not repeated here.

An embodiment of the present disclosure further provides a computer-readable storage medium, wherein the computer-readable storage medium stores program instructions that, when executed, implement the method according to any one of the above embodiments.

An embodiment of the present disclosure provides a computer program product comprising program instructions that, when executed, implement the method of any one of the above embodiments.

In the above embodiments, it should be understood that the disclosed apparatus and method may be implemented in other ways. For example, the apparatus embodiments described above are merely illustrative. For example, the division of the modules is merely a logical function division, and there may be other division modes in actual implementations, for example, a plurality of modules may be combined or integrated into another system, or some features may be ignored or not executed. In another aspect, the displayed or discussed mutual coupling or direct coupling or communication connection to one another may be performed via some interfaces, and the indirect coupling or communication connection to a device or module may be in electrical, mechanical or other form.

In addition, each functional module in various embodiments of the present disclosure may be integrated into one processing unit, or each module may exist physically alone, or two or more modules may be integrated into one unit. The unit integrated by the above modules may be implemented in the form of hardware or hardware plus software functional units.

The integrated module implemented in the form of a software functional module can be stored in a computer readable storage medium. The above software functional module is stored in a storage medium, and includes several instructions for causing a computer apparatus (which may be a personal computer, a server, a network apparatus, or the like) or a processor to perform some of the steps of the methods described in the various embodiments of the present disclosure.

The above storage medium may be implemented by any type of volatile or non-volatile storage apparatus or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disc. The storage medium may be any available medium that can be accessed by a general purpose or special purpose computer.

Those of ordinary skill in the art will appreciate that all or part of the steps to implement the above method embodiments may be accomplished by hardware related to program instructions. The foregoing program may be stored in a computer readable storage medium. When the program is executed, the steps including the above method embodiments are executed. The foregoing storage medium includes various media that can store program codes, such as a ROM, a RAM, a magnetic disk, or an optical disk.

Finally, it should be noted that the above embodiments are merely intended to describe the technical solutions of the present disclosure and not to limit them; although the present disclosure is described in detail with reference to the foregoing embodiments, those of ordinary skill in the art should understand that the technical solutions described in the foregoing embodiments may still be modified, or some or all of the technical features thereof may be equivalently substituted; and these modifications or substitutions do not deviate the nature of the respective technical solutions from the scope of the technical solutions of the embodiments of the present disclosure.

What is claimed is:

1. An information processing method, performed by a screen-transmission sending end, comprising:
   in response to a first operation that inputs characters in an input box, displaying the input characters in the input box of a first screen transmission application of the screen-transmission sending end;
   determining a target screen-transmission code according to the input characters, wherein a number of characters contained in the target screen-transmission code is greater than a number of the input characters, and the target screen-transmission code contains the input characters;
   displaying the target screen-transmission code in the input box;
   parsing the target screen-transmission code, and obtaining an IP address of a screen-transmission receiving end;
   establishing a connection with the screen-transmission receiving end according to the IP address;
   sending the target screen-transmission code to the screen-transmission receiving end to obtain a check result of the target screen-transmission code; and
   in response to the check result being that a check is passed, sending screen transmission data to the screen-transmission receiving end.

2. The information processing method according to claim 1, wherein determining the target screen-transmission code according to the input characters comprises:
   displaying at least one candidate screen-transmission code containing the input characters, wherein the at least one candidate screen-transmission code includes the target screen-transmission code; and
   in response to a second operation that selects the target screen-transmission code from the at least one candidate screen-transmission code, determining the target screen-transmission code.

3. The information processing method according to claim 2, wherein before displaying the at least one candidate screen-transmission code containing the input characters, the method further comprises:
   determining a character string according to the input characters and an input order of the input characters; and
   determining that a screen-transmission code containing the character string is the candidate screen-transmission code.

4. The information processing method according to claim 1, wherein determining the target screen-transmission code according to the input characters comprises: matching a screen-transmission code with the input characters, and wherein the screen-transmission code is previously input into the screen-transmission sending end or received by the screen-transmission sending end from the screen-transmission receiving end.

5. The information processing method according to claim 4, wherein the screen-transmission code is obtained by processing the IP address using a screen-transmission-code generation algorithm, and the screen-transmission code and the IP address are in a one-to-one correspondence.

6. The information processing method according to claim 1, wherein determining the target screen-transmission code according to the input characters comprises:
   in response to the number of candidate screen-transmission codes containing the input characters being 1, determining that the candidate screen-transmission code is the target screen-transmission code.

7. The information processing method according to claim 1, further comprising:
sending a request message to the screen-transmission receiving end when detecting that a second screen transmission application of the screen-transmission receiving end is opened, wherein the request message is used to request the screen-transmission receiving end to synchronize a screen-transmission code corresponding to the screen-transmission receiving end to the screen-transmission sending end; and
receiving the screen-transmission code corresponding to the screen-transmission receiving end.

8. The information processing method according to claim 1, wherein the input characters in the input box of the first screen transmission application of the screen-transmission sending end is editable.

9. The information processing method according to claim 1, wherein the target screen-transmission code is determined when first N characters of the target screen-transmission code are input and displayed in the input box, wherein N is less than the number of characters contained in the target screen-transmission code.

10. An information processing method, performed by a screen-transmission receiving end, comprising:
in response to a startup operation that starts a first screen transmission application of the screen-transmission receiving end, triggering a display module to display a screen-transmission code corresponding to the screen-transmission receiving end;
sending the screen-transmission code to a screen-transmission sending end, so that the screen-transmission sending end determines, according to user's first operation that inputs characters contained in a target screen transmission code in an input box of a second screen transmission application of the screen-transmission sending end, that the target screen-transmission code is the screen-transmission code and the screen-transmission sending end displays the target screen-transmission code in the input box of the second screen transmission application of the screen-transmission sending end, wherein a number of characters contained in the target screen-transmission code is greater than a number of the input characters;
establishing a connection with the screen-transmission sending end;
receiving the target screen-transmission code from the screen-transmission sending end;
checking the target screen-transmission code to obtain a check result of whether a check is passed;
sending the check result to the screen-transmission sending end; and
in response to the check result being that the check is passed, receiving screen transmission data from the screen-transmission sending end.

11. The information processing method according to claim 10, wherein before sending the screen-transmission code to the screen-transmission sending end, further comprising:
receiving a request message from the screen-transmission sending end, wherein the request message is sent by the screen-transmission sending end when detecting that the first screen transmission application of the screen-transmission receiving end is opened, and the request message is used to request the screen-transmission receiving end to synchronize the screen-transmission code to the screen-transmission sending end.

12. An electronic apparatus, comprising:
a memory storing computer-readable instructions; and
a processor coupled to the memory and configured to execute the computer-readable instructions, wherein the computer-readable instructions, when executed by the processor, cause the processor to perform operations comprising:
in response to a first operation that inputs characters in an input box, displaying the input characters in the input box of a first screen transmission application of a screen-transmission sending end;
determining a target screen-transmission code according to the input characters, wherein a number of characters contained in the target screen-transmission code is greater than a number of the input characters, and the target screen-transmission code contains the input characters;
displaying the target screen-transmission code in the input box;
parsing the target screen-transmission code, and obtaining an IP address of a screen-transmission receiving end;
establishing a connection with the screen-transmission receiving end according to the IP address;
sending the target screen-transmission code to the screen-transmission receiving end to obtain a check result of the target screen-transmission code; and
in response to the check result being that a check is passed, sending screen transmission data to the screen-transmission receiving end.

13. The electronic apparatus according to claim 12, wherein determining the target screen-transmission code according to the input characters comprises:
displaying at least one candidate screen-transmission code containing the input characters, wherein the at least one candidate screen-transmission code includes the target screen-transmission code; and
in response to a second operation that selects the target screen-transmission code from the at least one candidate screen-transmission code, determining the target screen-transmission code.

14. The electronic apparatus according to claim 13, wherein before displaying the at least one candidate screen-transmission code containing the input characters, the operations further comprise:
determining a character string according to the input characters and an input order of the input characters; and
determining that a screen-transmission code containing the character string is the candidate screen-transmission code.

15. The electronic apparatus according to claim 12, wherein determining the target screen-transmission code according to the input characters comprises: matching a screen-transmission code with the input characters, wherein the screen-transmission code is previously input into the screen-transmission sending end or received by the screen-transmission sending end from the screen-transmission receiving end.

16. The electronic apparatus according to claim 15, wherein the screen-transmission code is obtained by processing the IP address using a screen-transmission-code generation algorithm, and the screen-transmission code and the IP address are in a one-to-one correspondence.

17. The electronic apparatus according to claim 12, wherein determining the target screen-transmission code according to the input characters comprises:
- in response to the number of candidate screen-transmission codes containing the input characters being 1, determining that the candidate screen-transmission code is the target screen-transmission code.

18. The electronic apparatus according to claim 12, wherein the operations further comprise:
- sending a request message to the screen-transmission receiving end when detecting that a second screen transmission application of the screen-transmission receiving end is opened, wherein the request message is used to request the screen-transmission receiving end to synchronize a screen-transmission code corresponding to the screen-transmission receiving end to the screen-transmission sending end; and
- receiving the screen-transmission code corresponding to the screen-transmission receiving end.

19. The electronic apparatus according to claim 12, wherein the input characters in the input box of the first screen transmission application of the screen-transmission sending end is editable.

20. The electronic apparatus according to claim 12, wherein the target screen-transmission code is determined when first N characters of the target screen-transmission code are input and displayed in the input box, wherein N is less than the number of characters contained in the target screen-transmission code.

* * * * *